US012081579B2

(12) United States Patent
Fox et al.

(10) Patent No.: US 12,081,579 B2
(45) Date of Patent: Sep. 3, 2024

(54) ENTERPRISE SERVER AND METHOD WITH UNIVERSAL BYPASS MECHANISM FOR AUTOMATICALLY TESTING REAL-TIME COMPUTER SECURITY SERVICES

(71) Applicant: MASTERCARD TECHNOLOGIES CANADA ULC, Vancouver (CA)

(72) Inventors: Justine Celeste Fox, Pitt Meadows (CA); Sunita Khera, Delta (CA); Lian Jiang Fu, Victoria (CA); Perry McGee, Vancouver (CA); Igor Opushnyev, New Westminster (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 308 days.

(21) Appl. No.: 17/550,652

(22) Filed: Dec. 14, 2021

(65) Prior Publication Data

US 2022/0191234 A1    Jun. 16, 2022

Related U.S. Application Data

(60) Provisional application No. 63/125,732, filed on Dec. 15, 2020.

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01)

(58) Field of Classification Search
None
See application file for complete search history.

(56) References Cited

U.S. PATENT DOCUMENTS

2003/0009696 A1\* 1/2003 Bunker V. ........... H04L 63/1433
                                                                 726/26
2003/0212908 A1\* 11/2003 Piesco ................. H04L 63/1433
                                                                 709/200

(Continued)

FOREIGN PATENT DOCUMENTS

WO    WO-2017127850 A1 \*   7/2017 ........... G01C 21/387

OTHER PUBLICATIONS

International Search Report and Written Opinion for Application No. PCT/CA2021/051806 dated Mar. 18, 2022 (12 pages).

*Primary Examiner* — Kambiz Zand
*Assistant Examiner* — Mahabub S Ahmed
(74) *Attorney, Agent, or Firm* — Michael Best & Friedrich LLP

(57) ABSTRACT

Enterprise cybersecurity systems and methods related to receiving or accessing a real-time cybersecurity request, automatically transmitting a live mode request to a first cybersecurity microservice to generate cybersecurity risk-scoring information, receiving a response to the live mode request, calculating a cybersecurity score, automatically populating cybersecurity response data based on the calculated cybersecurity score, and automatically transmitting the cybersecurity response data to the enterprise client electronic device. The enterprise cybersecurity system and method also includes, after the cybersecurity response data has been transmitted to the enterprise client electronic device, automatically transmitting a test mode request to at least one test mode cybersecurity microservice, wherein the test mode request includes real-time data extracted from the real-time cybersecurity request.

20 Claims, 5 Drawing Sheets

(56) References Cited

U.S. PATENT DOCUMENTS

| | | | | |
|---|---|---|---|---|
| 2004/0015728 A1* | 1/2004 | Cole | ............... | G02B 5/3083 |
| | | | | 709/224 |
| 2004/0078384 A1* | 4/2004 | Keir | ............... | H04L 41/12 |
| | | | | 707/999.102 |
| 2014/0278623 A1* | 9/2014 | Martinez | ............ | G06Q 10/06 |
| | | | | 705/7.12 |
| 2016/0330219 A1* | 11/2016 | Hasan | ............. | G01C 21/387 |
| 2017/0046519 A1* | 2/2017 | Cam | ............... | G06N 7/01 |
| 2017/0111396 A1* | 4/2017 | Chesla | ........... | H04L 63/1416 |
| 2017/0214701 A1* | 7/2017 | Hasan | ............. | H04L 63/1491 |
| 2018/0096153 A1* | 4/2018 | DeWitte | ........... | G06F 21/552 |
| 2018/0191680 A1* | 7/2018 | Ahuja | ............. | H04L 63/0245 |
| 2019/0052664 A1* | 2/2019 | Kibler | ............. | G06F 11/301 |
| 2019/0245883 A1* | 8/2019 | Gorodissky | ...... | H04L 63/1433 |
| 2019/0260779 A1* | 8/2019 | Bazalgette | ....... | H04L 51/224 |
| 2019/0394214 A1* | 12/2019 | Ahuja | ............. | H04L 63/1408 |
| 2020/0220875 A1* | 7/2020 | Harguindeguy | ... | H04L 63/101 |
| 2021/0250365 A1* | 8/2021 | Atkinson | .......... | H04L 63/20 |
| 2021/0306321 A1* | 9/2021 | Calegari | .......... | H04L 63/108 |
| 2022/0060512 A1* | 2/2022 | Crabtree | .......... | H04L 63/1425 |
| 2023/0283641 A1* | 9/2023 | Crabtree | .......... | G06N 5/022 |
| | | | | 726/22 |

\* cited by examiner

```
{
  "paths":{
    "/sample/endpoint":{
      "post":{
        "x-amazon-apigateway-request-validator":"basic",
        "summary":"Sample Open API spec.",
        "description":"Sample Open API Spec \n",
        "operationId":"sampleEndpoint",
        "requestBody":{
          "description":"Sample description.",
          "required":true,
          "content":{
            "application/json":{
              "schema":{
                "type":"object",
                "properties":{
                  "ip":{
                    "description":"Sample Field - The IP address of the consumer device attempting to authorize with your product/service. The IP address must represent the HTTP client of the service consumer and not the service provider. Supported versions include IPv4 and IPv6. Invalid parameters will result in request validation errors.",
                    "type":"string",
                    "pattern":"^(((([1]?\\d)?\\d|2[0-4]\\d|25[0-5])\\.){3}(([1]?\\d)?\\d|2[0-4]\\d|25[0-5]))|([\\da-fA-F]{1,4}(\\:[\\da-fA-F]{1,4}){7})|(([\\da-fA-F]{1,4}:){0,5}::([\\da-fA-F]{1,4}:){0,5}[\\da-fA-F]{1,4})$",
                    "x-nds-np":"IP"
                  },
                  "ua":{
                    "description":"Sample Field - The user-agent string of the consumer device attempting to authorize with your product or service. The user-agent must represent thee HTTP client of the service consumer with details on the software originating the request. The user-agent string is validated as part of the assessment. Invalid user-agent values contribute to a higher risk factor.",
                    "type":"string",
                    "x-nds-np":"ua"
                  },
                  "required":[
                    "ip",
                    "ua"
                  ],
                  "example":{
                    "ip":"1.2.3.4",
                    "ua":"Mozilla/5.0 (Macintosh; Intel Mac OS X 10_14_6) AppleWebKit/537.36 (KHTML, like Gecko) Chrome/78.0.3904.87 Safari/537.36",
                  }
                }
              }
            }
          }
        }
      }
    }
  }
}
```

ENTERPRISE SERVER AND METHOD WITH UNIVERSAL BYPASS MECHANISM FOR AUTOMATICALLY TESTING REAL-TIME COMPUTER SECURITY SERVICES

CROSS-REFERENCE TO RELATED APPLICATION

This application claims priority to U.S. Provisional Patent Application No. 63/125,732, filed Dec. 15, 2020, the entire contents of which is hereby incorporated by reference in its entirety.

FIELD

The present disclosure is related to deployment and testing of cybersecurity microservices in a distributed cybersecurity microservices architecture. For example, the present disclosure relates to testing of new cybersecurity microservices (real-time server systems/services that provide a real-time cybersecurity-related response (e.g., transmittal of a score) in response to a cybersecurity request transmitted by an electronic device).

BACKGROUND

A microservice is a modular software component or service that performs one or more defined jobs that is independent of other instances and services. Cybersecurity microservices perform security analysis (e.g., fraud risk scoring, such as log-in risk or transaction validation). In the related art, there is a growing number of new cybersecurity microservices.

The new cybersecurity microservices could be tested offline using offline data. However, without proper testing on real-time production data in a real operational environment (i.e., with live or real-time production data), the test results, which impact a customer's business (e.g., an enterprise client's online service), can be unreliable/unpredictable. Thus, there is a need in the related art for a method of testing new cybersecurity microservices with live data.

SUMMARY

Although testing the new cybersecurity microservice with live data is desired, adding the new cybersecurity microservice into an existing enterprise cybersecurity infrastructure for testing is burdensome for multiple reasons.

First, implementing the new cybersecurity microservice in the existing architecture may impact the customer by providing a slower response during normal operation (e.g., when using the existing cybersecurity microservices infrastructure to obtain a cybersecurity score/summary). For example, the customer may provide a retail cyber service (e.g., financial account management) and use a cybersecurity microservice architecture for cybersecurity.

Implementing the new cybersecurity microservice in the existing cybersecurity microservice architecture can cause response time delays, e.g., from the additional local processing of the new cybersecurity microservice, from asynchronous execution of microservices including the new cybersecurity microservice and/or from the network communications with the new cybersecurity microservice which may have a longer response time than the existing microservices, etc. Each additional cybersecurity microservice that is added to the enterprise cybersecurity architecture or environment may require additional processing time and add lag time. As an example, an enterprise cybersecurity environment that performs a real-time log-in risk/fraud detection service adds an extra layer of computer processing when using a new cybersecurity microservice, which slows down the response time of the real-time cybersecurity microservice. Therefore, there is a need in the related art to improve systems and methods of testing new real-time cybersecurity microservices that reduces the processing load and response time and that does not impact the existing microservices operation (i.e., enable the test mode requests without any impact to the existing live mode of the cybersecurity microservices architecture).

Second, adding a new cybersecurity microservice into an existing cybersecurity microservices architecture/environment requires significant manual coding efforts, which can be time consuming and labor intensive. That is, in the related art, additional person-hours for coding are needed for each new cybersecurity microservice integration. Thus, to make the integration more efficient, there a need for universality or portability with the code used for integrating a new cybersecurity microservice for testing so that different types of microservices may be tested using the same code.

Cybersecurity microservices need a way to be deployed in a testing mode (dark mode) in existing enterprise cybersecurity microservices environments using a universal method so that the new microservice can be rapidly deployed for testing without significant delay (e.g., a delay for person-hours needed for new integration coding), and so that the new cybersecurity microservice can access real-time or live data in the enterprise cybersecurity microservice environment without impacting the existing enterprise application's customer experience (i.e., without causing significant delay that impacts the response time of the existing enterprise cybersecurity microservice architectures). In other words, there is a need for a universal/portable enterprise cybersecurity server device and method for seamlessly transmitting real-time data to new cybersecurity microservices (for testing, training, etc.) without reducing the response time of the existing (live) real-time cybersecurity microservice.

In one embodiment, the present disclosure includes an enterprise cybersecurity server system. The enterprise cybersecurity server system includes a network communication interface configured to communicate over a network with electronic devices, at least one memory storing at least a computer program, and one or more processors. The one or more processors configured by way of the computer program stored in the at least one memory to accessing a real-time cybersecurity request transmitted by an enterprise client electronic device, in response to accessing the real-time cybersecurity request, automatically controlling the network communication interface to transmit a live mode request to one or more first cybersecurity microservices that are in live mode, wherein the live mode request includes real-time data extracted from the real-time cybersecurity request, and each of the one or more first cybersecurity microservices that are in live mode is a microservice that generates cybersecurity risk-scoring information, receiving one or more responses to the live mode request from the one or more first cybersecurity microservices, each of the one or more responses including the respective generated risk-scoring information. Additionally, in response to receiving each of the one or more responses to the live mode request from the one or more first cybersecurity microservices: automatically calculate a cybersecurity score using the risk-scoring information included in the one or more responses returned from the one or more first cybersecurity microservices, automatically populate cybersecurity response data based on the calculated cybersecurity score, and automatically control the network communication interface to transmit the cybersecurity response data to the enterprise client electronic device. After the cybersecurity response data has been transmitted to the enterprise client electronic device, automatically control the network communication interface to transmit a test mode request to at least one test mode cybersecurity microservice, wherein the test mode request includes the real-time data extracted from the real-time cybersecurity request.

In another embodiment, the present disclosure includes a method. The method includes accessing, with a server system, a real-time cybersecurity request transmitted by an enterprise client electronic device. The method includes in response to accessing the real-time cybersecurity request, automatically transmitting, with the server system, a live mode request to one or more first cybersecurity microservices that are in live mode, wherein the live mode request includes real-time data extracted from the real-time cybersecurity request, and each of the one or more first cybersecurity microservices that are in live mode is a microservice that generates cybersecurity risk-scoring information. The method includes receiving, with the server system, one or more responses to the live mode request from the one or more first cybersecurity microservices, each of the one or more responses including the respective generated cybersecurity risk-scoring information. The method includes in response to receiving each of the one or more responses to the live mode request from the one or more first cybersecurity microservices: automatically calculating, with the server system, a cybersecurity score using the risk-scoring information included in the one or more responses returned from the one or more first cybersecurity microservices, automatically populating, with the server system, cybersecurity response data based on the calculated cybersecurity score, and automatically transmitting, with the server system, the cybersecurity response data to the enterprise client electronic device. The method also includes after the cybersecurity response data has been transmitted to the enterprise client electronic device, automatically transmitting, with the server system, a test mode request to at least one test mode cybersecurity microservice, wherein the test mode request includes the real-time data extracted from the real-time cybersecurity request.

In yet another embodiment, the present disclosure includes a non-transitory computer-readable medium comprising computer-executable instructions that, when executed by a processor, cause the processor to perform a set of operations. The set of operations includes accessing a real-time cybersecurity request transmitted by an enterprise client electronic device. The set of operations includes in response to accessing the real-time cybersecurity request, automatically transmitting a live mode request to one or more first cybersecurity microservices that are in live mode, wherein the live mode request includes real-time data extracted from the real-time cybersecurity request, and each of the one or more first cybersecurity microservices that are in live mode is a microservice that generates cybersecurity risk-scoring information. The set of operations includes receiving one or more responses to the live mode request from the one or more first cybersecurity microservices, each of the one or more responses including the respective generated cybersecurity risk-scoring information. The set of operations includes in response to receiving each of the one or more responses to the live mode request from the one or more first cybersecurity microservices: automatically calculating a cybersecurity score using the risk-scoring information included in the one or more responses returned from the one or more first cybersecurity microservices, automatically populating cybersecurity response data based on the calculated cybersecurity score, and automatically transmitting the cybersecurity response data to the enterprise client electronic device. The set of operations also includes after the cybersecurity response data has been transmitted to the enterprise client electronic device, automatically transmitting a test mode request to at least one test mode cybersecurity microservice, wherein the test mode request includes the real-time data extracted from the real-time cybersecurity request.

BRIEF DESCRIPTION OF THE DRAWINGS

The disclosed subject matter, including features will be more apparent from the following detailed description and the accompanying drawings in which:

FIG. 3 illustrates an example of a sample specification, in accordance with an embodiment.

DETAILED DESCRIPTION

Figure 1:
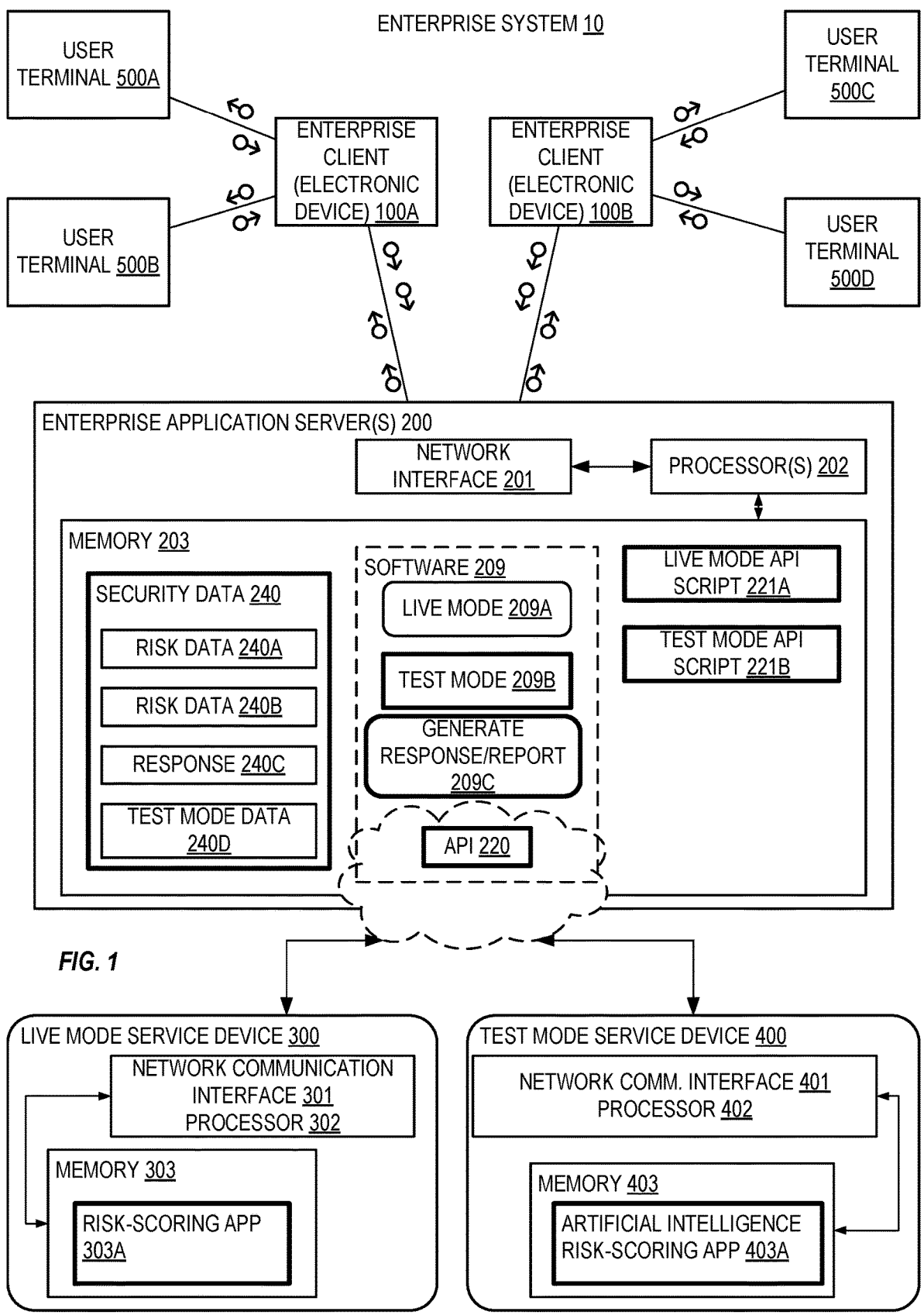
FIG. 1 illustrates an enterprise cybersecurity server system according to an embodiment.

As discussed above, new cybersecurity microservices need to be tested. This testing can include deploying the new cybersecurity microservice in a testing/dark mode in enterprise applications (e.g., a cloud server providing an enterprise application) so that the cybersecurity microservices may be accessed by the enterprise application in real-time without impacting live computer security systems that are currently operating in the enterprise application. That is, a bypass mechanism is needed that allows the new cybersecurity microservice(s) to use the live data (e.g., real-time production data) for testing/training without slowing down any other processes (e.g., other cybersecurity microservices) that are also using the real-time data.

According to various embodiments, the present disclosure provides a bypass mechanism that bypasses a specific flow of the cybersecurity microservices running in the live mode for testing/training a new cybersecurity microservice. This bypass mechanism makes the enterprise application's existing application programming interface (API) faster for the live mode (compared to adding the new cybersecurity microservice in with the other existing microservices), while providing testing/training for the new cybersecurity microservice with real-time authentic data. As an example, bypassing the specific flow can include one or more of: waiting to issue a test mode request until after the live mode response data (e.g., log-in risk score response) is transmitted back to the enterprise client device, and waiting for a test mode response before continuing the rest of the live mode processing (e.g., generating the live response, reading a next API specification corresponding to a next security microservice).

According to an embodiment, after the live mode cybersecurity response data has been transmitted back to the enterprise client, the testing or dark mode functionality may be activated, and a web request may be created and transmitted in a "fire and forget" manner.

Additionally, the program code that generates the web request for the test mode cybersecurity microservice may be executed in a universal manner so that the specification file (e.g., a Hypertext Transfer Protocol (HTTP) API specification, such as an Open API Specification) can be used for any new external microservice to be integrated with the enterprise application. That is, the program code mechanism may be universal or portable so that any partner cybersecurity microservice (e.g., using any microservice that produces the HTTP API specification) may be supported and integrated easily into the enterprise server application in testing mode without needing a developer/engineer to manually update application code every time a new partner cybersecurity microservice is tested. This flexibility (universality) and portability makes the real-world job of enterprise application integration engineers easier (because there is no need to update the distribution (integration code) every time a new cybersecurity microservice needs to be deployed for testing). For example, the adding in of the new microservice for deployment and testing may have previously required a developer/engineer to perform the following steps: reading a specification (e.g., a HTTP API specification), building a client for the read HTTP API specification, modifying system core API code to make a call using the client that was built for the read HTTP API specification, re-configuring properties added for the endpoint, etc. In addition, the previous method of adding new cybersecurity microservices may have required a distribution update every time a new cybersecurity microservice is added and would additionally require coordination with the customer.

However, with a universal approach as described herein, any new cybersecurity microservice that produces a specification (e.g., an HTTP specification) can be deployed in testing mode with minimal coding effort. The minimal coding effort, according to an embodiment, may include for example, the developer/engineer adding one or more custom properties (e.g., via the x-nds-np property) to an existing API specification, and enabling the testing mode function for the required site and queries in the configuration file (e.g., a config file).

FIG. 1 illustrates an enterprise communication system 10 according to an embodiment of the present disclosure. The enterprise cybersecurity microservice system 10 may include one or more enterprise application servers 200, which may provide a cybersecurity microservices infrastructure, which may include cloud computing and network communication with one or more enterprise client electronic devices 100A and 100B. Cloud computing (a service or microservice) may refer to a service provided by one or more distributed networked electronic devices (e.g., computers, servers) connected via the Internet that provide data storage and computing power/services to multiple users over the Internet.

The enterprise client electronic devices 100A and 100B are shown, but the scope of the disclosure covers more than the two enterprise client electronic devices 100A and 100B, which are used as examples. For ease of reference, an enterprise client electronic device 100 is referred to in the present disclosure, which may correspond to either or both of electronic devices 100A and 100B.

The enterprise client electronic device 100 may be a computer or a server and may handle Big Data processing (e.g., hundreds of transactions per second), which cannot reasonably be processed efficiently by a person. Each of the one or more enterprise client electronic devices 100 may include a hardware processor, a memory and a network communication interface configured to communicate with one or more user terminals 500 (e.g., user terminals 500A-500D) and to communicate with the enterprise application server(s) 200, which may be an enterprise cybersecurity application server. The enterprise client electronic device 100 may provide a retail application/service that the user terminals 500 use (e.g., a credit report monitoring service, a banking service, a budgeting software service, etc.). The memory of enterprise client electronic device 100 may include enterprise application client-side software that is executed by the processor of the enterprise client electronic device 100 to cause the enterprise client electronic device 100 to interoperate with the enterprise application of the enterprise application server(s) 200.

The enterprise client electronic device 100 may use the enterprise application server 200 to use a real-time enterprise cybersecurity service provided by the enterprise application server 200. As an example, the real-time cybersecurity service that may be provided by the enterprise application server 200 may be a cybersecurity service that detects computer/network security risk or fraud, and may, for example, send cybersecurity risk response data to the enterprise client electronic device 100 as a response to a cybersecurity request transmitted by the enterprise client electronic device 100 to enterprise application server 200 in real-time (e.g., instantaneously).

As another example, the enterprise cybersecurity service/application may include one or more of: a real-time continuous validation service (e.g., validation of an authorized user, transaction validation, etc.), a real-time log-in risk scoring service and a real-time fraud detection service.

The live mode service device 300 (which may be referred to as a live mode service 300 in the disclosure) may include a network communication interface 301, a hardware processor 302, and a memory 303, which may store computer code for executing a cybersecurity risk-scoring application 303A by the processor 301. The test mode service device 400 may include a network communication interface 401, a hardware processor 402, and a memory 403, which may include computer code for executing, by the processor 402, an AI risk-scoring application 303A, such as an MVL enterprise cybersecurity microservice. Although one processor is referred to, the processor 402 may include a distributed processor including multiple processors. The test mode service device 400 may include one or more deep learning (DL) models. Each of the DL models may be a neural network. The DL model may be a deep learning-based system.

The user terminals 500 (500A-500D) may each comprise one or more processors, one or more memories and one or more network communication interfaces. The enterprise client electronic device 100 may also comprise one or more processors, one or more memories and one or more network communication interfaces. The enterprise client electronic devices 100 may be configured to communicate bidirectionally with the user terminals 500 and the enterprise application server 200 in real-time.

The enterprise application server 200 may comprise a network communication interface 201, one or more processors 202 and one or more memories 203. The network communication interface 201 may be configured to receive or access data transmitted from one or more devices, such as, enterprise client electronic device 100, the live mode service 300 and the testing mode service 400. The one or more memories 203 of the enterprise application server 200 may store cybersecurity data 240. As an example, the stored cybersecurity data 240 may include fraud or validation related data, such as cybersecurity risk data 240 (240A, 240B) that may include one more cybersecurity risk scores, such as a log-in risk score. The stored cybersecurity data 240 may further include response data 240C, and test mode data 240D, which may include a test mode score.

An enterprise client electronic device 100 can terminate a user's session (e.g., associated with device 500A) or disable a user account based on a cybersecurity microservice response being received from live mode cybersecurity microservices (e.g., authentication services, identity validation services, fraud detection service, trusted device services). For example, the real-time enterprise cybersecurity microservice may include a real-time enterprise log-in risk or transaction validation service. The real-time enterprise cybersecurity microservice may be realized by way of an electronic device, such as one or more servers comprising at least a hardware processor, and a network communication interface.

The processor 202 may execute program code stored in the memory 203, such as software 209, which may be embodied in a non-transitory computer-readable medium, such as a hard drive or a flash drive. The software that is executed by the processor 202 of the enterprise application server 200 may include live mode functionality 209A, test mode functionality 209B and report/response generation functionality 209C.

Figure 2A:
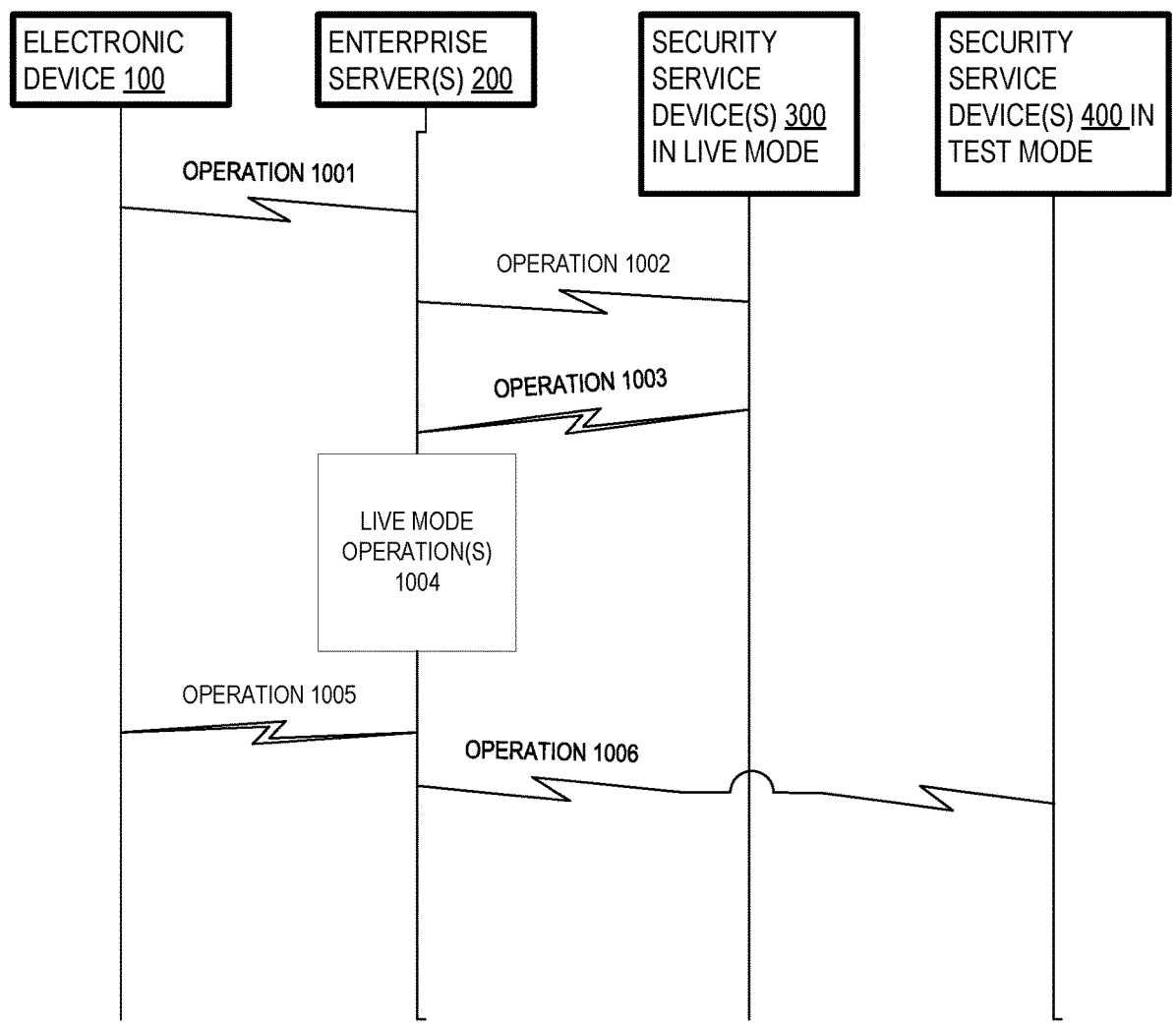
FIG. 2A illustrates a flow of an enterprise cybersecurity method according to an embodiment.
Figure 2B:
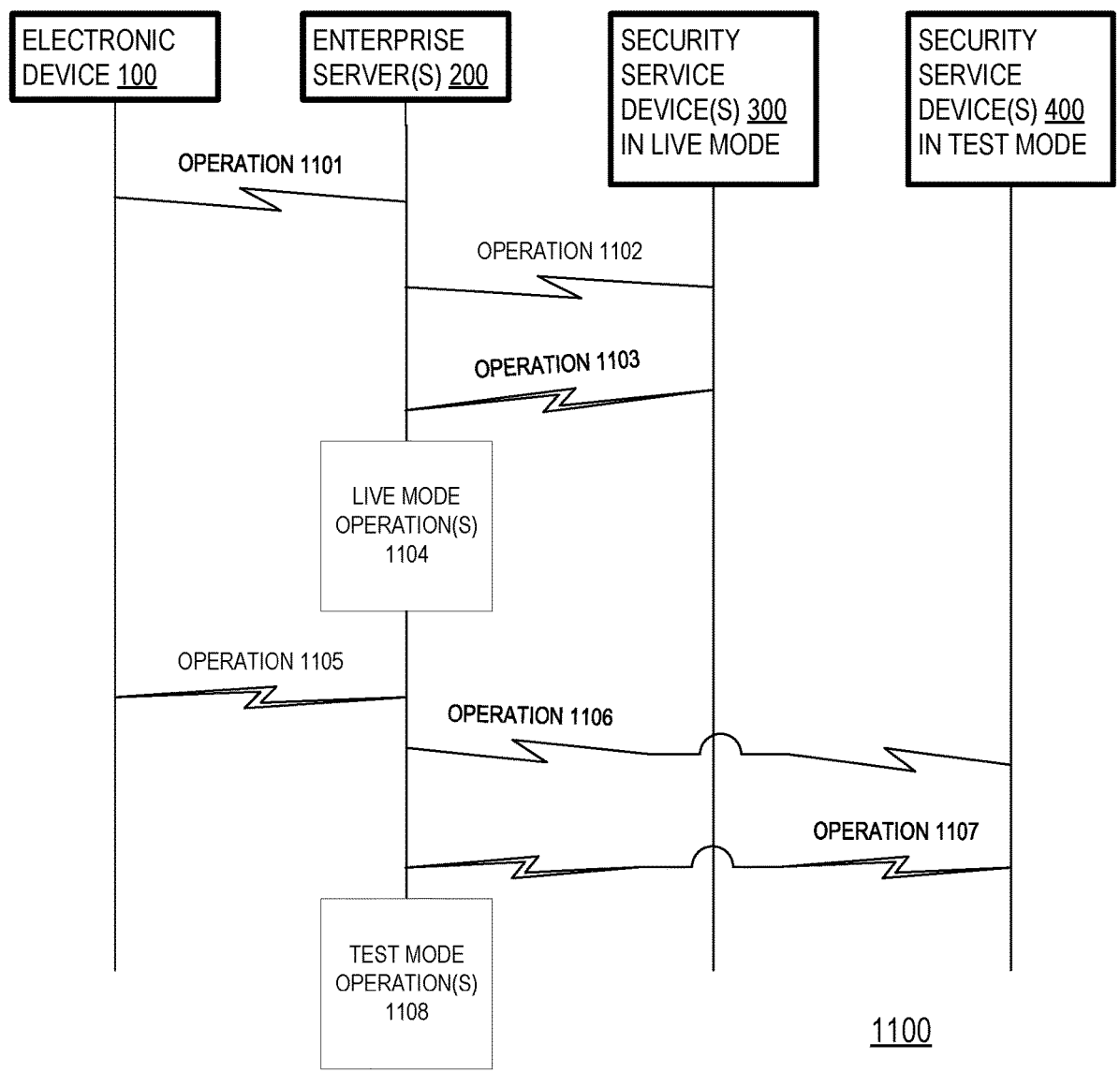
FIG. 2B illustrates a flow of another enterprise cybersecurity method according to an embodiment.

FIGS. 2A and 2B show logic diagrams (flowcharts) of methods 1000 and 1100 performed by a processor 202 of enterprise application server 200, in accordance with various embodiments. The processor 202 of the enterprise application server 200 may be configured to execute code (instructions code) stored in a memory 203, which causes the processor to execute a series of operations, such as method 1000 or method 1100, which may include all Operations of FIG. 2A or all of the Operations of FIG. 2B, or a portion of the respective operations.

The live mode functionality 209A may correspond to the live mode functionality (or live mode generation functionality) discussed below with reference to FIG. 2A and live mode gathering Operations 1002 and 1003 and live mode processing, including one or more of Operation(s) 1004-1005. The processor 202 may handle Big Data processing (e.g., petabytes of data per day), which cannot reasonably be processed efficiently by a person, such as by way of the live mode functionality 209A for multiple different clients. The test mode functionality 209B may be used for testing using a portion of the data collected for the live mode functionality 209A.

The test mode software 209B may correspond to the testing mode functionality discussed below with reference to FIG. 2A and testing mode operation 1006 or FIG. 2B with testing mode gathering Operations 1106 and 1107 and the testing mode processing operation(s) 1108. In FIGS. 2A and 2B, method 1100 differs from method 1000 in that method 1100 includes additional Operations 1107 and 1108, which method 1000 does not have. Method 1000 may be used for training of a neural network in a test mode cybersecurity microservice using the "fire and forget" manner that does not require a response. That is, method 1000 includes a "fire and forget" method where operation 1006 may end the processing of the testing mode functionality. For purposes of ease of reading, it is noted that Operations 1001-1006 may correspond to Operations 1101-1106, and thus are not repeated here. However, Operation 1100 may include additional operations, such as Operations 1107 and 1108. According to an embodiment, Operation 1000 may be performed a predetermined number of times, prior to Operation 1100 being performed, such as for training a neural network of the test mode cybersecurity microservice.

The response/report generation functionality 209C may include generating a live response (e.g., response data 240C or a report summarizing the response data 240C) in response to a real-time cybersecurity request based on, for example, the risk data 240A and/or risk data 240B. The report generation functionality 209C may include generating a report (e.g., an offline report) that includes at least a score based on the test mode data 240D, which may be a testing mode risk score or testing mode risk score data. According to an embodiment, the generated report (e.g., offline report) may include information that is displayable by an electronic device, such as, a user terminal of a user that manages the enterprise client electronic device 100. The enterprise application server 200 may transmit the report or displayable information corresponding to at least a portion of the report to the enterprise client electronic device 100. The enterprise client electronic device 100 may, for example, display the displayable information or the report or communicate with a user terminal that displays the displayable information or the report.

According to an embodiment, as shown in FIG. 2A, an enterprise server system 10 may perform an enterprise method 1000. According to an embodiment, the enterprise method 1000 may include one or more or all of the Operations 1001-1006 shown in FIG. 2A performed by a server or cloud server (e.g., enterprise application server(s) 200), for automated request handling for testing of a new real-time cybersecurity microservice, while not disrupting an existing real-time "live" enterprise cybersecurity service.

As shown in Operation 1001 of FIG. 2A, the electronic device 100 may transmit data (e.g., a real-time cybersecurity request, such as a real-time log-in risk assessment or score request, a real-time validation request, or a real-time fraud detection request) to an enterprise application server(s) 200 that receives or accesses the real-time cybersecurity request. The enterprise application server 200 may be the same or similar to the enterprise application server 200 discussed in FIG. 1. According to an embodiment, the enterprise application server 200 may provide a real-time cybersecurity microservices architecture including a cybersecurity microservice (e.g., log-in risk scoring, fraud detection) via live mode service device 300, and provide a corresponding response to a real-time enterprise client/customer cybersecurity request.

According to an embodiment, the real-time cybersecurity request may include user information including one or more of the internet protocol (IP) address of a terminal (e.g., of one of the user terminals 500 that is using the enterprise client's own service), browser information, such as browser name, used by the terminal, user agent (UA) string or hash representation of an account identifier (ID) for a user who is logging in or making a purchase.

In Operation 1002, the enterprise server(s) 200 may, in response to receiving or accessing the real-time cybersecurity request, automatically control the network communication interface to perform the live mode processing. The live mode processing may including transmit a live mode request to one or more cybersecurity microservices that are in live mode (e.g., one or more live mode devices 300, which each provide a cybersecurity microservice that are known to the enterprise server(s) 200 as being available for use, or "live"). The live mode processing may include local processing or may include using backend microservices via external devices. The terms "receive or access" are used because the data (e.g., real-time cyber security request) may be stored and accessed.

According to an embodiment, the live mode request may include real-time data extracted from the real-time enterprise client/customer cybersecurity request. According to an embodiment, the one or more cybersecurity microservices in live mode (e.g., provided by live mode service devices 300) may include a microservice that generates cybersecurity risk-scoring information. The live mode microservices may correspond to cloud services implemented by at least a hardware processor.

In Operation 1003, the enterprise application server(s) 200 may receive or access one or more responses to the live mode request from the one or more live mode service devices 300. According to an embodiment, each of the one or more responses to the live mode request may include, for example, the respective generated cybersecurity risk-scoring information generated by each of the transmitting live mode service devices 300 (the devices providing the microservices that are in live mode).

In response to receiving or accessing the one or more responses to the live mode request from the one or more live mode service devices 300, the enterprise server(s) 200 may automatically perform live mode operations (e.g., Operation 1004) corresponding to the live mode processing functionality, which may be a part of live mode functionality 209A of FIG. 1.

For example, in Operation 1004, in response to the receiving of all (or a threshold subset) of the one or more responses to the live mode request in Operation 1003, Operation 1004 may be automatically performed. According to an embodiment, Operation 1004 may include one or more live mode processing operations. According to an embodiment, the one or more live mode processing operations may include automatically calculating a score (e.g., a login-risk score, or a potential fraud score) using the risk-scoring information included in the one or more responses returned from the one or more live mode service devices 300. According to an embodiment, the one or more live mode operations may include automatically populating real-time cybersecurity response data (e.g., real-time log-in risk data) based on the calculated score (e.g., the calculated potential fraud score). Of course, other operations may be performed as a part of the live mode operation(s) 1004. Although receiving is used as a trigger condition in this paragraph, accessing the same data may be used as a trigger condition, according to various embodiments.

After the live mode processing operation(s) 1004 have been completed, in Operation 1005, the processor 200 of the enterprise application server(s) 200 may automatically control the communication interface 201 of the enterprise application server(s) 200 to transmit the cybersecurity response data (e.g., the real-time validation or fraud detection response data) back to the enterprise client electronic device 100A or 100B in real-time. That is, according to an embodiment, the real-time cybersecurity request may be used, by the enterprise application server 200, to perform previously used microservices (e.g., including at least some look ups via back end microservices) and then once the request has been processed (i.e., live mode is over), testing mode processing (e.g., via testing mode functionality 209B) may be performed.

According to an embodiment, the enterprise application server(s) 200 may store data to map to a testing mode request structure required by the new microservice that is to be tested. For example, the enterprise server(s) 200 may store one or more specification files. The stored one or more specification files may include an HTTP API specification (e.g., an openAPI specification) with an additional custom property that can be used for mapping to the testing mode request structure (i.e., the request structure of a new microservice that is to be run in testing or dark mode). The example each custom property may map to a piece of the user information described above with a one-to-one correspondence.

According to an embodiment, Operation 1006 may be performed. As an example, according to an embodiment, after Operation 1005 has been performed, Operation 1006 may be performed. Operation 1006 may include, automatically controlling, by the enterprise application server(s) 200, the network communication interface(s) of the enterprise application server(s) to transmit a test mode request to at least one test mode service device 400 (e.g., providing a test mode cybersecurity microservice). The Operation 1006 of transmitting the test mode request may, in some ways, be the same as or similar to the Operation 1002 of transmitting the live mode request. However, according to various embodiments, the Operation 1006 may not need to communicate with the enterprise client electronic device, or at least not during the same time frame (i.e., it may communicate with a different back end that does not respond to the server). According to an embodiment, the test mode request may include real-time data extracted from the received real-time enterprise client/customer cybersecurity request. That is, according to an embodiment, the test mode request may be based on a portion of the extracted data (e.g., the same or similar extracted data) extracted from the live mode real-time request discussed in Operation 1002. According to an embodiment, the test mode request may be generated by using a schema factory class that reads all of the available HTTP API specifications (or a subset, such as the available HTTP API or OpenAPI specifications that are indicated as being in testing mode) and populates data for the web request to the test mode microservice for each test mode microservice (e.g., via various test mode service devices, like test mode service device 400).

According to an embodiment, Operation 1006 may include the following operations: identifying any stored specification files (e.g., HTTP API specifications) corresponding to cybersecurity microservices that are to be run running in the test mode, executing the identified specification files (e.g., HTTP APIs) by reading the corresponding stored specification, and as a part of running the specification, populating the test mode request with any required information by using the custom property or custom properties in the specification as a link to the actual value(s) of the required information (e.g., the user information, such as the user agent information and/or IP address).

According to an embodiment, a registration or pre-processing method may include: receiving or accessing a file (e.g., an ipconfig file, an HTTP API file) from a customer (e.g., from enterprise client device 100) for testing a new cybersecurity microservice, storing the file, or modifying/updating an existing file, such as a universal specification file (e.g., a universal HTTP API specification file) with the received information (e.g., ipconfig information), The registration or pre-processing method may occur prior to the method 1000 or method 1100 occurring, according to various embodiments. The accessing may include, for example, accessing a configuration file (e.g., based on a configuration a user set up in a user dashboard).

Operation 1106 may include similar functionality as Operation 1006. According to an embodiment, the test mode request of Operation 1006 or 1106 may be generated using a HTTP API specification (e.g., an Open API (OpenAPI) specification). However, other types of specifications may be used to document the APIs, such as RESTful API Modeling Language (RAML) specifications may be used. Also, a custom property (e.g., x-nds-np property) may be used in the HTTP API specification to align the internal data points of the enterprise server application of the enterprise application server. According to an embodiment, the custom property may be a new field that is added into the HTTP API specification with dual anchors that are used for an internal and script rules engine of the enterprise server 200 that are then mapped to the new microservice (e.g., the data points from the enterprise server application are mapped to the microservice request body).

According to an embodiment, Operation 1006 or 1106 may include transmitting the test mode request to the at least one test mode service device 400. According to an embodiment, the transmitting of the test mode request in Operation 1006 or 1106 includes populating information, such as user agent information, in the test mode request by using a custom property of the universal specification file, and transmitting the test mode request to the new microservice to be tested. Operation 1006 or 1106 may be in an invisible "fire and forget". However, method 1100 (FIG. 2A) illustrates additional processing of the response to the test mode request. Similar operations described above may be similar or the same and are not repeated herein.

Operation 1107 may be similar to or the same as Operation 1003 or 1103, but receiving or accessing data from a different source. For example, Operation 1107 may include the enterprise server(s) 200 receiving or accessing one or more responses to the test mode request from the one or more testing mode security microservices 400. According to an embodiment, each of the one or more responses may include the respective generated scoring information (e.g., risk-scoring information) generated by the transmitter (i.e., the transmitting test mode microservice electronic device).

In response to receiving the one or more responses to the testing mode request from the one or more testing mode service devices 400, the enterprise server(s) 200 may automatically perform testing mode operation(s) 1008 corresponding to the testing mode functionality.

According to an embodiment, the method 1100 may further include Operation 1008, which may include one or more of calculating an overall improvement score for at least one of the one or more test mode cybersecurity microservices, and generating a report (e.g., an offline report) based on the calculated overall improvement score. In an embodiment, the generated report shows analytical data showing at least one of: an improvement in at least one cybersecurity metric based on at least one test mode microservice and a name(s) of the at least one test mode microservice. For example, the displayed improvement may show a percentage increase in accuracy while maintaining a false-positive rate below a threshold (e.g., a sub-0.1% false-positive rate). The false-positive rate is a metric that is equal to a number of false-positives divided by a sum of false-positives and true negatives. According to an embodiment, the generated report (e.g., the offline report) may be displayed by the electronic device 100, may be transmitted (e.g., by email or messaging), may be printed or saved, etc.

According to an embodiment, the one or more test mode cybersecurity microservices may include at least one artificial intelligence (AI) or machine learning (ML) service. Each of the AI/ML services may be a networked cybersecurity microservice that uses a neural network and that performs deep learning. However, the new cybersecurity microservice to be tested may be a different type of microservice, such as a look up microservice, or a rules-based microservice. Each cybersecurity microservice may be a cloud microservice. The cybersecurity microservices may have a different type of AI or ML than those discussed above.

According to an embodiment, the cycle of Operations 1001-1006 may be repeated continuously to perform, for example, continuous validation or continuous fraud detection. Likewise, Operations 1101-1108 may be repeatedly performed. Repeatedly performed may mean in a repeating manner during specific predefined time intervals. However, less of the operations may be performed during certain periods (e.g., when no test mode microservices are being tested nor trained).

As another example, the method 1000 and method 1100 may each include the test mode being performed after the live mode response data has been transmitted back to the enterprise client electronic device 100 after a case where all of the live mode microservices and microservices that impact the response data have been called, the score has been calculated, and transmitted back to the enterprise client electronic device 100. According to an embodiment, cybersecurity microservices to be tested out in test mode may be called after the fact such that the embodiments of FIGS. 2A and 2B save significant processing time by making the test mode a post-request processing operation(s). From a user (enterprise client) perspective, the test mode may be completely transparent (where the enterprise client does not notice any difference in the existing processing while the test mode functionality is implemented).

According to an embodiment, a web request may have the following flow: (1) an enterprise application web request is received, by an enterprise server, from an enterprise client electronic device associated with an enterprise client, (2) the main or cloud enterprise server builds and transmits requests to microservices that are in live mode, (3) data from a response to the live mode request is received and used, by the main or cloud enterprise server, to calculate a score (or other value) and populate the response data for building a response to the web request (e.g., score-related data), (4) the enterprise server transmits the response to the web request back to the web requesting-enterprise client electronic device, and (5) after the response to the web request has been transmitted back to the web requesting-enterprise client electronic device, the enterprise server transmits requests to the microservices in the test mode. According to an embodiment, the schema factory class reads all of the available specifications or a portion thereof (e.g., HTTP API specifications, OpenAPI specifications) and populates the data for the web request for each microservice associated with the read specifications. The enterprise server may use a custom property (e.g., the x-nds-np property) to align with the internal data points of the application. The schema factory class and the custom property are discussed in more detail with regards to Operation 1006, and FIGS. 3 and 4 below.

According to method 1000, the "fire and forget" call may be used (e.g., in FIG. 2A), and from that it may be unnecessary to wait on a response that returns from the external test mode microservices. The "fire and forget" call may also be made and then processing of the original enterprise client request may be stopped (e.g., stopping the processing from, for example, the NuDetect and API layer). Also, when a test mode microservice is tested and meets certain conditions, a microservice that is in test mode may be added into (converted into) live mode.

According to an embodiment, the cybersecurity microservice operating in test mode may be trained based on receiving one or multiple instances of the live production data in Operation 1006. That is, Operation 1006 may be performed routinely (multiple times, such as, thousands of times) with the live mode processing such that the neural network of the test mode service device 400 in the testing mode is trained. By preparing training data for each of the different microservices operating in test mode, models that are specific for the microservice may be built by training. The training may be performed via the method 1000 of FIG. 2A.

The implementation details of the testing mode operation (Operation 1006) discussed above with relation to FIGS. 2A and 2B, will be further explained. According to an embodiment, Operation 1006 may include a pre-requisite operation of using requestors or handlers within an engine (e.g., a NuDetect engine) to automatically associate data points (e.g., enterprise server application data points, such as NuDetect data points) to the API requests that have been built for the test mode cybersecurity microservices. That is, according to an embodiment, the rules engine may transmit data to new test mode cybersecurity microservices with very minimal configuration changes or no code changes needing to be performed. According to an embodiment, a custom property may be provided in the HTTP API specification that allows the rules engine to push the data points of the enterprise server application that it needs for building the test mode request into the test mode request automatically.

Referring back to FIG. 1, the memory 203 may further include an application programming interface (API) 220 as a part of the software 209. For example, an HTTP API (e.g., OpenAPI) interface may be used as API 220. The memory may further include live mode API script(s) 221A and test mode API script 222B. However, the two API scripts 221A and 221B may be combined into one universal script or specification.

According to an embodiment, the data that is required to make the request to a test mode service device 400 may be programmatically generated (or built) using test mode API script 221B. As an example, the data that is required to make the request to a test mode service device 400 may be programmatically generated using test mode API script 221B which causes processor 202 to add one or more properties to the request fields in the HTTP API specification which is attributed to a specific data point within the test mode application. According to an embodiment, programmatically generated or built includes generating a mapping of the microservice request body within the code whereby the request body from the HTTP API specification file is populated from the data points of the enterprise server application.

According to an embodiment, a custom property (e.g., "x-nds-np") may be added to one or more HTTP API specification files which may then be used to generate the data required for the test mode request. According to an embodiment, an extension to an API specification may be provided that links to the rule engines script path of the enterprise application server 200, so that the rules engine (which has applications that allow for the writing of rules on all the data points that get sent into the API) may link to the paths via the extension. According to an embodiment, the custom property (e.g., x-nds.np) is added to the API specification, which allows the API specification to link to the data points in the enterprise server application.

FIG. 3 shows an example of a sample OpenAPI specification 221C according to an embodiment of the present disclosure. Although OpenAPI specification is shown as an example, the API specification 221C may be a different type of API specification, such as a different type of HTTP API specification. According to an embodiment, OpenAPI specification 221C may be used as test mode API script 221B. According to an embodiment, OpenAPI specification 221C may be used as a live mode API script 221A and as a test mode API script 221B.

According to an embodiment, the description of the path (e.g., an N-script path) may appear in the enterprise server's rules engine or in the open API specification when reading for a value corresponding to the custom property. According to an embodiment, the custom property may be x-nds.np, where "np" stands for N-script path, which indicates which N-script path will provide the value that the API is looking for.

According to an embodiment, in the first custom property ("x-nds-np") in FIG. 3, the API specification is looking for an IP address (see the lower case "ip" above the description line), thereby defining the custom property in the API specification. Thus, when the microservice in test mode wants an IP address to be included in the test mode request, the custom property (e.g., x-nds.np) may link the IP address to the enterprise application N-script path (which is upper case "IP" in FIG. 3), which will allow the enterprise server application, when reading the test mode API files, to automatically insert the IP value into the request structure as it is built.

As another example, in FIG. 3, the lower case "ua" right above the description may stand for user agent. However, the N-script path for a browser name in ua is a bit different. According to an embodiment, the N-script path that is being referenced by the "x-nds-np":"ua" text of FIG. 3 is ua browser name, which instructs the enterprise server to send the browser name as the UA property to that API. The browser name may be, for example, a name of a browser (e.g., FireFox® or Chrome®) or a version of a browser name.

These custom properties may be based on data extracted from the real-time cybersecurity request from the enterprise client/customer. According to an embodiment, the code added to the enterprise rules engine may take the customer property (e.g., the upper-case "IP") and replace the upper-case "IP" with the actual IP address (extracted from the enterprise client's request) when building the API request for the test mode cybersecurity microservices. Although an IP data point and a UA data point are discussed above, many different data points of the enterprise server application may be used to perform profiling and various security look ups. For example, the IP address may be used to perform a look up to see the latitude and longitude or the country that the IP comes from. In addition, the IP address may be checked against any block lists or white lists. The reputation of the IP may be checked to identify previous fraudulent activity. Look ups may be performed in parallel on the data points of the enterprise server application to obtain additional context.

According to an embodiment, all or a portion of the client data received plus the additional context may be fed into an enterprise rules engine that may be used to write fraud rules and policies against all of the data or a portion of the data. A new test mode cybersecurity microservice may be built on the back end to perform one of the parallel security look ups, such as, one or more of: another trust service, trying to identify if the account has been taken over, trying to count simple values, or identifying the device.

The new test mode cybersecurity microservices may be tested with test mode with zero impact to the enterprise client device 100 (i.e., no impact to the existing live mode cybersecurity microservices infrastructure), and one of the practical applications of using these test mode methods 1000 and 1100 is to enable a product or sales/marketing team to run test mode tests for customers without it impacting their existing contracts or changing what they are using (i.e., easy of prototype integration). The test mode also has the capability to provide data for building offline reports (e.g., to show the customers how much more lift or value they can get if they enable these additional microservices being tested in test mode). Another benefit is in the modification to the software development life cycle by providing more responsive and quicker iterations for building new microservices or testing changes to them.

According to an embodiment, the additional custom property may be added to the new HTTP API specifications so that the APIs are created. That is, when a new cybersecurity microservice creates a new API, the new cybersecurity microservice produces an API specification for that API that tells engineers how to use it correctly, and within that specification they are adding an additional property that tells the rule engine (e.g., the enterprise cybersecurity server) how to add the data point to that property when it is creating a request to that new microservice. In other words, the addition or the extension of the HTTP API specification to include that new property links it to the enterprise application server data in the enterprise application API.

By linking the API extension property to the mechanism within the API, the actual data point may be obtained. According to an embodiment, an N-script path may be used. According to an embodiment, the request body and parameters for the test mode processing may be retrieved from the HTTP API specification by a schema factory class which further places that data (e.g., the request body and parameters) into a request class. The data may be programmatically retrieved from the specification file by using a key (e.g., the custom property) that is attributed to specific data points within the service of the enterprise server application.

According to an embodiment, a service oriented architecture (SOA) handle may be created for each service request object (e.g., each test mode service request object) and the SOA handle may be registered to run in the post request functionality. All of the test mode requests may then be made asynchronously in a fire and forget fashion to the external test mode services/service devices 400. According to an embodiment, all of the requests to the new cybersecurity microservice may be asynchronously made in a fire and forget fashion to the external microservices via a NGINX load balancer, such as, for a predetermined amount of time.

According to an embodiment, to perform the fire and forget method (e.g., method 1000), the NDAPI NGINX load balancer configuration may use the proxy_ignore_client_abort feature in the default proxy configuration: #Default Proxy Configurations (as shown below as an example)

```
# ===========================
proxy_http_version 1.1;
proxy_ignore_client_abort on;
proxy_connect_timeout 1s;
Ref: http://nginx.org/en/docs/http/ngx_http_proxy_module.html#proxy_ignore_client_abort
Sample for Nginx fire and forget call, returning 200 status code :
server {
listen 80;
location /mirror-service {
proxy_pass https://service;
proxy_ignore_client_abort on;
return 200;
}
location ~* /w-12345 {
proxy_pass https://abc;
proxy_set_header abc;
}
```

The "fire and forget" capability allows the enterprise application to not need to wait for the response back from the external test mode cybersecurity microservice and will continue on with the post request processing of the enterprise application. The test mode functionality may be triggered in the post-request stage only and will be a "fire and forget" call as the response back is not required. In the post-request (or postRequest) functionality, a SOA handle for the test mode may be registered, and a "fire-and-forget" call may be made using the endpoint retrieved from operational settings and the enterprise client real-time request.

The test mode functionality may be controlled by operational configurations (or configs) that enable the partner service and contain the information for the endpoint itself. The configs may be updated and maintained by an internal operations team so that access is restricted, which makes this design inherently secure. According to various embodiments, computer security microservices may use passive biometrics, such as location data and/or user agent information, such as one or more of internet protocol (IP) address information or web browser information. Thus, as an example, an IP address data field may be required for a request to be made in a new cybersecurity microservice (e.g., an AI/ML fraud detection device).

According to an embodiment, when the IP address data field is required for the request to the new microservice, the following custom property can be added to the HTTP API specification file: "x-nds-np": "IP". Once the HTTP API spec file (e.g., test mode API script 221B) is programmatically read and executed by the processor 202, the processor 202 is configured to retrieve (or extract) the IP address, such as from the real-time request made by the enterprise client electronic device 100. By using the custom property, a new universal and consistent way of integrating new services which requires minimal coding effort from the engineers is created.

By using the custom property, all the coders/engineers need to do at this point is:
 1. Add in the custom property (e.g., x-nds-np) to the HTTP API (e.g., OpenAPI) spec file for each request parameter; and 2. Enable operational configs which control the access and contain information for the endpoint.

According to an embodiment, the processor 202 may include sample operational settings, which may be stored in the memory 203. According to an embodiment, the sample operational settings may be:

```
[darkmode.sample1]
Endpoint = https://sample1.endpoint.com
path=/sample1/endpoint
method=post
[darkmode.sample2]
endpoint = https://sample2.endpoint.com
path=/sample2/endpoint
method=post
nudetect.configuration.darkmode.microservice.enabled= true
nudetect.configuration.darkmode.services= sample, sample2
```

Figure 4:
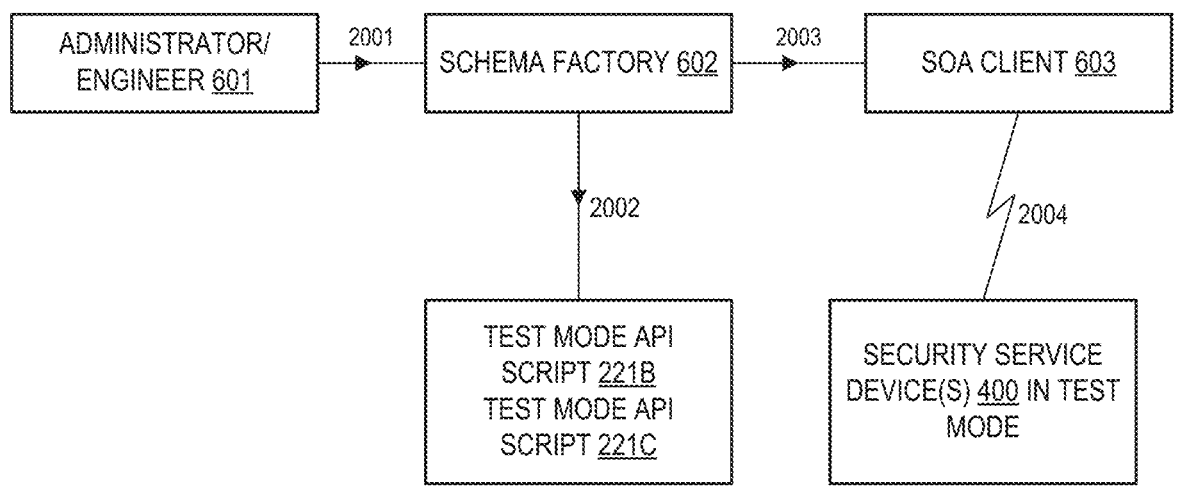
FIG. 4 illustrates a flow of adding a new specification file and operational configurations, in accordance with an embodiment.

According to an embodiment, as shown in FIG. 4, an administrator or engineer (or an electronic device operated by the administrator or engineer) 601 may integrate a new cybersecurity microservice with the enterprise application by adding a new API specification file and Operations configs, as shown in Operation 2001 of FIG. 4. As an example, operation 2001 may include transmitting, uploading or creating the new API specification file to a schema factory operation or module 602 by using an electronic device that the administrator/engineer 601 operates.

The processor 202 of the enterprise application server 200 may include and provide the schema factory operation or module 602. As shown by Operation 2002, the schema factory operation or module 602 may include a function of reading all of the available API specifications or a subset thereof (e.g., all that are saved in the memory) and populating the data for the web request for each microservice. According to an embodiment, a custom property (e.g., x-nds-np property) may be used to align with the internal data points of the of the enterprise server application. In Operation 2003, an SOA client 603 may create a handle for the web request using the data from Operation 2001.

According to an embodiment, an Operation 2004 may include the test mode service device 400 (providing the test mode cybersecurity microservices) being asynchronously called out using operational configurations. The operation configurations may contain the data that is relevant to the test mode cybersecurity microservices such as endpoints, a method, etc. Operations 2001-2004 may be referred to as high level test mode functionality flow during a postRequest stage.

To provide further implementation details, the test mode functionality may be triggered in the postRequest stage of a request handler only and may be a "fire and forget: call as the response back is not required. In the postRequest function in the ApiCallServerToServer class, a SOA handle may be registered for the test mode and a fire-and-forget call made using the endpoint retrieved from MasterSwitch settings and the generated customer request transmitted/sent.

According to an embodiment, data formats may be requested based on HTTP API (or Open API) being defined in masterswitch (e.g., OpenAPI specification JSON can be generated automatically by pipeline). According to an embodiment, the enterprise cybersecurity application API, provided by the enterprise application server 200, may provide a generic object or client built in that can consume JSON schema aspects from the environment configuration system to generate calls to the test mode or dark mode microservices. The enterprise application server 200 may load an API specification to perform various embodiments. The enterprise cybersecurity application API may receive or access the API specification from a configuration file (e.g., a config file containing JSON schemas in a website or an API specification or config file contained in the code, such as a specific folder within the enterprise cybersecurity application API that does not need to be updated because it contains all or a portion of the available files).

According to an embodiment, a universal test mode soaclient that can handle the API specifications and the universal resource locator (URL) endpoints may be provided. According to an embodiment, the soaclient may call out to a private link URL for any microservice that produces an HTTP API specification (or one of a certain type, such as OpenAPI specification).

According to an embodiment, a response from the cybersecurity microservice running in test mode is not used for the response payload that is sent back to the enterprise client/customer. According to an embodiment, the test mode functionality may be called only during post request so that it does not impact the live mode processing. According to an embodiment, the request made to the cybersecurity microservice running in test mode may be performed in a "fire and forget" manner.

According to various embodiments, a method or portions of a method may comprise one or more of: (1) a new cybersecurity microservice being integrated with the enterprise application (e.g., via the enterprise application server) by a new HTTP API or OpenAPI Spec file and operational configs being added (e.g., by user input of an Engineer), (2) reading, by a schema factory class of the enterprise application, all of the available HTTP API specifications and populating data for the web request for each new cybersecurity microservice (e.g., via a custom property, such as the x-nds-np property, is used to align with internal data points of the enterprise application), (4) an SOA client of the enterprise application creates a handle for the web request using the data from step (1), and (4) the microservices are asynchronously called out by the enterprise application/server using operational configs (e.g., operational configs containing data that is relevant to the new cybersecurity microservice such as endpoints, method etc.).

According to an embodiment, an enterprise application server website config may be used to "force DOA paths on", when the test mode microservice requires data points that are not already present in the request (e.g., only used doa paths are resolved). According to an embodiment, the custom property "x-nds-np" may be added into the sample API specification and may be used as a DOA N-script path for data generation. According to an embodiment, a "default" keyword may be used for a property with a constant value (e.g., OpenAPI does not mention const).

According various embodiments, a method or portions of a method may comprise: (A) accessing an API spec file associated with a cybersecurity microservice electronic device; (B) storing the API spec file in association with a testing mode status; (C) obtaining a real-time request from an enterprise client electronic device; performing live mode processing of the real-time cybersecurity request including transmitting a response to the real-time cybersecurity request to the enterprise client electronic device; (D) performing test mode processing of the real-time cybersecurity request, wherein the test mode processing includes: building a real-time cybersecurity request based on reading of the API spec file that is associated with the test mode request and based on populating a custom property via a custom property field included in the API spec file. According to various embodiments, the enterprise application server may store the API specification on its own configuration so that the API specification can be accessed quickly in real-time. The enterprise application server may be a main server that call various microservices. The configuration files may be accessed from configuration libraries or packages that, for example, are tied into a platform configuration.

As discussed in more detail in the present disclosure, the live mode service device 300 may include a scoring app (e.g., a risk-scoring app) 303A, and the test mode service device 400 may also include a scoring app (e.g., risk-scoring app) 403A. Although each of the scoring apps are shown as cybersecurity risk-scoring apps, other types of scoring may be implemented. In addition, although the scoring apps may be an AI/ML app, other types of service (e.g., a look up function, or a rule-based app) may be used.

The electronic devices, such as the server or user terminal, may be any type of computing or electronic device, such as, a desktop personal computer (PC), a tablet computer, a laptop, a smartphone, a personal digital assistant (PDA), or an e-book reader, and the like. The user terminals may be communicably connected via a network (e.g., the Internet) so as to communicate with the enterprise application server 200. The network may be any one of a local area network (LAN), a wide area network (WAN) or the Internet. According to an embodiment, the user terminal functionality may also be performed by or controlled by the enterprise application server 200, which may be a responsive server.

Each of the above-described memories may store computer code that includes instructions, which when executed by the processor/controller, causes the controller to execute various functions. The various functions pertinent to this disclosure are explained in detail (e.g., the operations of FIGS. 2A, 2B and 4). However, other functions that are known to one or ordinary skill in the art could also be performed. The controller/processor may be configured to perform the various functions discussed in more detail below.

Each of the one or more memories may include one or more storage devices and associated media, such as, a hard drive, or a solid-state drive. However, other types of media may be used such as compact disc (CD)/digital versatile disc (DVD) Read-only memory (ROM)/Read-Write (RW), a thumb-drive, a removable hard drive or solid-state drive, a legacy magnetic media such as a tape drive, a floppy disc drive, a specialized ASIC based device, or the like.

"Computer readable media" or "computer readable medium" as used in connection with the specification encompass non-transitory media (e.g., transmission media, or carrier waves). The computer readable media can have computer code for performing various computer-implemented functions. The media storing the computer code can be specially designed and constructed for the purposes of the present disclosure or can be a common media.

As an example, and not by way of limitation, the processor(s) discussed above may include central processing units (CPUs), graphics processing units (GPUs), accelerators, and the like executing software embodied in one or more tangible, computer-readable media. Such computer-readable media can be media associated with a storage device, or with internal mass storage (e.g., Read-Only Memory (ROM) or Random-Access Memory (RAM)). The present disclosure encompasses any suitable combination of hardware and software. Networks may be, for example, wired, wireless, or optical. Networks can further be a local area network (LAN), such as, an airplane LAN, a wide-area network (WAN) and be real-time. Examples of networks include Ethernet, wireless LANs, cellular networks (e.g., GSM, 3G, 4G, 5G, LTE).

In this regard, the responsive server may be configured to provide real-time updates automatically. The server and/or other electronic devices (e.g., 100) may include or be at least configured to be connected to one or more peripheral devices, such as, one or more of: a display (e.g., a touch screen display), a keyboard, a microphone (e.g., for voice input), a camera (e.g., for gesture input), a mouse, a joystick, a scanner, a trackpad, or a biometric capture device (e.g., a device that captures one or more of: fingerprint, palm print, iris information).

The enterprise application server 200 or enterprise client electronic device 100 may include or be at least configured to be connected to one or more output devices, such as, a speaker, or a display or display device (e.g., a mobile phone, computer, or a haptic feedback display touch screen device), a display, tactile output, sound, and light, and smell/taste. The display (sometimes referred to as a display screen) may include any type of display screen, such as, a touch screen display, an organic light emitting diode (OLED) screen, a liquid crystal display (LCD) screen, a cathode ray tube (CRT) screen, glasses and printers.

Organizations (e.g., Big Data organizations, financial technology organizations) require innovative new technologies to deliver advanced enterprise cybersecurity microservices. However, before deployment (i.e., going live) for the customer enterprise client (i.e., before giving an enterprise client access to the new cybersecurity microservice), testing of the new cybersecurity microservice (or sub-service/microservice) using live or real-time data may be desired. In the realm of testing, there is a need to deploy new cloud microservices in a testing mode within a real-time enterprise cybersecurity application to, for example, enable the evaluation of the accuracy of algorithms and confirmation the approach of the new microservice through verification of existing real-time data prior to going live (i.e., giving the customer (enterprise client) access to the new cybersecurity microservice). Further, if the cybersecurity microservice is a specific type of microservice (e.g., an artificial intelligence (AI) or machine learning (ML)) cybersecurity microservice, the microservice may need to be trained with live data (e.g., real-time production data) before the evaluation can be performed. In addition, testing of the cybersecurity microservice may be helpful to, for example, provide a demonstration of the new cybersecurity microservice (and the overall value of the cybersecurity microservice) to an enterprise client prior to the enterprise client implementing the new cybersecurity microservice. The enterprise client may correspond to one or more electronic devices (e.g., mobile devices, such as smartphones, or servers) that interact with users associated with the enterprise client (e.g., logged-in users of an enterprise client application).

The above-described embodiments may be implemented in any of numerous ways. For example, the embodiments may be implemented using hardware, software or a combination thereof. When implemented in software, the software code may be executed on any suitable processor or collection of processors, whether provided in a single computer or distributed in a modular fashion among a number of different computers or processors.

Also, the various methods or processes outlined herein may be coded as software that is executable on one or more processors that employ any one of a variety of operating systems or platforms. Additionally, such software may be written using any number of suitable programming languages and/or programming or scripting tools, and also may be compiled as executable machine language code or intermediate code that is executed on a framework or virtual machine.

In this respect, various inventive aspects may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be transportable, such that the program or programs stored thereon may be loaded onto one or more different computers or other processors to implement various inventive aspects as discussed above.

The terms "program" or "software" are used herein in a generic sense to refer to any type of computer code or set of computer-executable instructions that may be employed to program a computer or other processor to implement various inventive aspects as discussed above. Computer-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the disclosed embodiments may be embodied as a method, of which examples have been provided. The acts performed as part of the method may be ordered in any suitable way. Accordingly, embodiments may be constructed in which acts are, performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The phrases "or" and "and/or" should be understood to mean "either or both" of the elements so conjoined, i.e., the elements that are conjunctively present in some cases and disjunctively present in other cases.

Having thus described several inventive aspects of at least some embodiments, it is to be appreciated that various alterations, modifications, and improvements will readily occur to those skilled in the art. Such alterations, modifications and improvements are intended to be within the spirit and scope of the present disclosure. Accordingly, the foregoing description and drawings are by way of example only.

The following list of advantages is non-limiting and other advantages, which may be apparent to a person of ordinary skill in the art may also be provided by various embodiments of the disclosure.

According to an embodiment, using the enterprise application APIs for testing of the new cybersecurity microservices is faster (than integration into the existing infrastructure) since all new microservices deployed in the test mode are performed after the live mode response has been transmitted back to the customer's electronic device (e.g., the enterprise client). According to an embodiment, using the "fire and forget" call allows the test mode post request processing to be fast as well since it will not need to wait on any response from the external service (e.g., the new test mode cybersecurity microservice).

In addition, according to various embodiment, the development time for integrating new cybersecurity microservices in test mode is substantially reduced. According to an embodiment, microservices may be rapidly deployed in test mode to enable testing out of the microservice (e.g., an internal or external cybersecurity microservice) and to make improvements without adding risk and complexity to the live mode product (e.g., the existing live mode cybersecurity microservices).

According to an embodiment, the server and method are designed so that cybersecurity microservices that produce a HTTP API specification have a way to be deployed in test mode on an enterprise server (e.g., the Enterprise NuDetect® server(s)) in an easy and universal way so that they can be accessed via the enterprise server security product as a real-time API. Web requests may be performed in a fire and forget manner after the response has been sent back to the customer.

According to an embodiment, cybersecurity microservices that produce a HTTP API specification (e.g., an OpenAPI specification) may be easily integrated into the enterprise application without having to update the distribution every single time a new cybersecurity micro service needs to be deployed in test mode. With this approach, any new cybersecurity micro service can be deployed in test mode with minimal coding effort.

What is claimed:

1. An enterprise cybersecurity server system for automatically testing real-time cybersecurity microservices, the enterprise cybersecurity server system comprising:
   a network communication interface configured to communicate over a network with electronic devices;
   at least one memory storing at least a computer program; and
   one or more processors configured by way of the computer program stored in the at least one memory to:
      accessing a real-time cybersecurity request transmitted by an enterprise client electronic device;
      in response to accessing the real-time cybersecurity request, automatically controlling the network communication interface to transmit a live mode request to one or more first cybersecurity microservices that are in live mode, wherein the live mode request includes real-time data extracted from the real-time cybersecurity request, and each of the one or more first cybersecurity microservices that are in live mode is a microservice that generates cybersecurity risk-scoring information;

receiving one or more responses to the live mode request from the one or more first cybersecurity microservices, each of the one or more responses including the respective generated risk-scoring information;

in response to receiving each of the one or more responses to the live mode request from the one or more first cybersecurity microservices:

automatically calculate a cybersecurity score using the risk-scoring information included in the one or more responses returned from the one or more first cybersecurity microservices, automatically populate cybersecurity response data based on the calculated cybersecurity score, and automatically control the network communication interface to transmit the cybersecurity response data to the enterprise client electronic device; and after the cybersecurity response data has been transmitted to the enterprise client electronic device, automatically control the network communication interface to transmit a test mode request to at least one test mode cybersecurity microservice, wherein the test mode request includes the real-time data extracted from the real-time cybersecurity request.

2. The enterprise cybersecurity server system of claim 1, wherein an enterprise application includes the at least one test mode cybersecurity microservice and the one or more first cybersecurity microservices, and wherein the at least one test mode cybersecurity microservice is in a testing/dark mode such that the one or more first cybersecurity microservices are accessible by the enterprise application in real-time without impacting live computer security systems that are currently operating in the enterprise application.

3. The enterprise cybersecurity server system of claim 1, wherein the at least one test mode cybersecurity microservice includes at least one from among: an artificial intelligence (AI) microservice, a machine learning (ML) cybersecurity microservice, a look up microservice, and a rules-based microservice.

4. The enterprise cybersecurity server system of claim 1, wherein the one or more processors are further configured to transmit the test mode request to the at least one test mode cybersecurity microservice in an invisible fire and forget manner after the cybersecurity response data has been transmitted to the enterprise client electronic device.

5. The enterprise cybersecurity server system of claim 1, wherein the one or more processors are further configured to generate the test mode request using an application programming interface (API) specification.

6. The enterprise cybersecurity server system of claim 5, wherein the API specification is a Hypertext Transfer Protocol (HTTP) API specification.

7. The enterprise cybersecurity server system of claim 6, wherein the HTTP API specification includes a custom property via a custom property field that is populated with a real value at run-time, and the one or more processors is further configured to generate the test mode request by populating the real value at run-time using the custom property of the custom property field of the HTTP API specification.

8. The enterprise cybersecurity server system of claim 1, wherein the one or more processors are further configured to:

receive a response to the test mode request;

calculate an overall improvement score for the at least one test mode cybersecurity microservice, the overall improvement score quantifying how much the at least one test mode cybersecurity microservice improves a cybersecurity microservices environment;

generate displayable report information based on the calculated overall improvement score; and store or transmit the displayable report information so that the enterprise client electronic device accesses and displays the displayable report information.

9. The enterprise cybersecurity server system of claim 5, wherein the enterprise client electronic device is configured to terminate a user's session or disable a user account responsive to the cybersecurity score contained in the cybersecurity response data being less than a cybersecurity score threshold.

10. The enterprise cybersecurity server system of claim 1, wherein the at least one test mode cybersecurity microservice is at least one of: an authentication service, an identity validation service, a fraud detection service, or a trusted device service.

11. A method comprising:

accessing, with a server system, a real-time cybersecurity request transmitted by an enterprise client electronic device; and in response to accessing the real-time cybersecurity request, automatically transmitting, with the server system, a live mode request to one or more first cybersecurity microservices that are in live mode, wherein the live mode request includes real-time data extracted from the real-time cybersecurity request, and each of the one or more first cybersecurity microservices that are in live mode is a microservice that generates cybersecurity risk-scoring information;

receiving, with the server system, one or more responses to the live mode request from the one or more first cybersecurity microservices, each of the one or more responses including the respective generated cybersecurity risk-scoring information;

in response to receiving each of the one or more responses to the live mode request from the one or more first cybersecurity microservices:

automatically calculating, with the server system, a cybersecurity score using the risk-scoring information included in the one or more responses returned from the one or more first cybersecurity microservices, automatically populating, with the server system, cybersecurity response data based on the calculated cybersecurity score, and automatically transmitting, with the server system, the cybersecurity response data to the enterprise client electronic device; and after the cybersecurity response data has been transmitted to the enterprise client electronic device, automatically transmitting, with the server system, a test mode request to at least one test mode cybersecurity microservice, wherein the test mode request includes the real-time data extracted from the real-time cybersecurity request.

12. The method of claim 11, wherein the at least one test mode cybersecurity microservice includes at least one from among: an artificial intelligence (AI) cybersecurity microservice, a machine learning (ML) cybersecurity microservice, a look up cybersecurity microservice and a rules-based cybersecurity microservice.

13. The method of claim 11, wherein the providing of the enterprise cybersecurity application includes transmitting the test mode request to the at least one test mode cybersecurity microservice in an invisible fire and forget manner after the cybersecurity response data has been transmitted to the enterprise client electronic device.

14. The method of claim 11, wherein providing of the enterprise cybersecurity application further includes generating the test mode request using a Hypertext Transfer Protocol (HTTP) application programming interface (API) specification.

15. The method of claim 14, wherein the HTTP API specification includes a custom property via a custom property field that is populated with a real value at run-time, and the providing of the enterprise cybersecurity application includes generating the test mode request by populating the real value at run-time using the custom property of the custom property field of the HTTP API specification.

16. The method of claim 11, further comprising:
terminating a user's session or disabling a user account, by the enterprise client electronic device, responsive to the cybersecurity score contained in the cybersecurity response data being less than a score threshold.

17. The method of claim 11, wherein the at least one test mode cybersecurity microservice includes at least one of: an authentication service, an identity validation service, a fraud detection service, or a trusted device services.

18. The method of claim 11, further comprising:
receiving a response to the test mode request;
calculating an overall improvement score for the at least one test mode cybersecurity microservice, the overall improvement score quantifying how much the at least one test mode cybersecurity microservice improves a cybersecurity microservices environment;
generating displayable report information based on the calculated overall improvement score; and
storing or transmitting the displayable report information so that the enterprise client electronic device accesses and displays the displayable report information.

19. A non-transitory computer-readable medium comprising computer-executable instructions that, when executed by a processor, cause the processor to perform a set of operations comprising:

accessing or receiving a real-time cybersecurity request transmitted by an enterprise client electronic device; and
in response to accessing or receiving the real-time cybersecurity request, automatically transmitting a live mode request to one or more first microservices that are in live mode, wherein the live mode request includes real-time data extracted from the real-time cybersecurity request, and each of the one or more first microservices that are in live mode is a microservice that generates security risk-scoring information;
receiving one or more responses to the live mode request from the one or more first microservices, each of the one or more responses including the respective generated risk-scoring information;
in response to receiving each of the one or more responses to the live mode request from the one or more first microservices:
automatically calculating a security score using the risk-scoring information included in the one or more responses returned from the one or more first microservices;
automatically populate cybersecurity response data based on the security score that is calculated; and
automatically transmitting the cybersecurity response data to the enterprise client electronic device; and
after the cybersecurity response data has been transmitted to the enterprise client electronic device, automatically transmitting a test mode request to at least one test mode microservice, wherein the test mode request includes the real-time data extracted from the real-time cybersecurity request.

20. The non-transitory computer-readable medium of claim 19, wherein the set of operations further includes:
receiving a response to the test mode request;
calculating an overall improvement score for at least one test mode cybersecurity microservice, the overall improvement score quantifying how much the at least one test mode cybersecurity microservice improves a cybersecurity microservices environment;
generating displayable report information based on the calculated overall improvement score; and
storing or transmitting the displayable report information so that the enterprise client electronic device accesses and displays the displayable report information.

* * * * *